US007614384B2

(12) United States Patent
Livshiz et al.

(10) Patent No.: US 7,614,384 B2
(45) Date of Patent: Nov. 10, 2009

(54) ENGINE TORQUE CONTROL WITH DESIRED STATE ESTIMATION

(75) Inventors: Michael Livshiz, Ann Arbor, MI (US); Douglas J. Babcock, Dexter, MI (US); Jeffrey M. Kaiser, Highland, MI (US); Christopher E. Whitney, Highland, MI (US); Per Andersson, Linkoping (SE); Magnus Johansson, Södertälje (SE)

(73) Assignee: GM Global Technology Operations, Inc.

( * ) Notice: Subject to any disclaimer, the term of this patent is extended or adjusted under 35 U.S.C. 154(b) by 11 days.

(21) Appl. No.: 12/111,397

(22) Filed: Apr. 29, 2008

(65) Prior Publication Data

US 2009/0118968 A1 May 7, 2009

Related U.S. Application Data

(60) Provisional application No. 60/984,890, filed on Nov. 2, 2007.

(51) Int. Cl.
*F02D 41/14* (2006.01)
*G06F 14/48* (2006.01)

(52) U.S. Cl. ........................ 123/399; 701/103; 701/115

(58) Field of Classification Search ................. 123/399, 123/400, 480, 486, 494, 406.45; 701/102, 701/103, 104, 106
See application file for complete search history.

(56) References Cited

U.S. PATENT DOCUMENTS 6,155,242 A * 12/2000 Kotwicki et al. ............ 123/704
6,363,316 B1 * 3/2002 Soliman et al. ............. 701/104
6,513,495 B1 * 2/2003 Franke et al. .......... 123/406.29
6,755,182 B1 * 6/2004 Kolmanovsky et al. ..... 123/478
6,760,656 B2 * 7/2004 Matthews et al. ........... 701/101
7,016,779 B2 * 3/2006 Bowyer ....................... 701/108
7,219,004 B2 * 5/2007 Kolmanovsky et al. ..... 701/104
7,369,934 B2 * 5/2008 Chatfield et al. ............ 701/104
7,529,614 B1 * 5/2009 Muller ........................ 701/102
2002/0179050 A1 * 12/2002 Soliman et al. ............. 123/399
2003/0005756 A1 * 1/2003 Soliman et al. ............... 73/116
2003/0101014 A1 * 5/2003 Farmer et al. ................. 702/99
2004/0216718 A1 * 11/2004 Kolmanovsky et al. ..... 123/346
2005/0131620 A1 * 6/2005 Bowyer ....................... 701/108

OTHER PUBLICATIONS

U.S. Appl. No. 11/656,929, filed Jan. 23, 2007, Michael Livshiz.
U.S. Appl. No. 11/685,735, filed Mar. 13, 2007, Michael Livshiz.

* cited by examiner

*Primary Examiner*—Thomas N Moulis
(74) *Attorney, Agent, or Firm*—Harness, Dickey & Pierce, P.L.C.

(57) ABSTRACT

An engine control system comprises a predicted airflow module, a first actuator determination module, a first desired air module, and an actuator position module. The predicted airflow module determines a predicted engine airflow based on a desired torque. The first actuator determination module determines a first engine actuator value based on the predicted engine airflow. The first desired air module selectively determines a first desired engine air value based on the first engine actuator value and the desired torque. The actuator position module determines a desired engine actuator value based on the first desired engine air value.

25 Claims, 5 Drawing Sheets

ENGINE TORQUE CONTROL WITH DESIRED STATE ESTIMATION

CROSS-REFERENCE TO RELATED APPLICATIONS

This application claims the benefit of U.S. Provisional Application No. 60/984,890, filed on Nov. 2, 2007. The disclosure of the above application is incorporated herein by reference.

FIELD

The present disclosure relates to control of internal combustion engines and more particularly to estimating desired operating states of internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY

An engine control system comprises a predicted airflow module, a first actuator determination module, a first desired air module, and an actuator position module. The predicted airflow module determines a predicted engine airflow based on a desired torque. The first actuator determination module determines a first engine actuator value based on the predicted engine airflow. The first desired air module selectively determines a first desired engine air value based on the first engine actuator value and the desired torque. The actuator position module determines a desired engine actuator value based on the first desired engine air value.

In other features, the first engine actuator value comprises a spark advance value. The predicted engine airflow comprises one of predicted air per cylinder (APC) and predicted mass airflow (MAF). The first engine actuator value comprises at least one of a spark advance value, an intake cam phaser angle, an exhaust cam phaser angle, and an air/fuel ratio. The first desired engine air value comprises a desired manifold absolute pressure (MAP). The engine control system further comprises a boost control module that controls one of a turbocharger and a supercharger based on the desired engine actuator value. The desired engine actuator value comprises a desired boost pressure.

In further features, the first desired engine air value comprises one of desired air per cylinder (APC) and desired mass airflow (MAF). The desired engine actuator value comprises a desired throttle area. The desired engine actuator value comprises a desired cam phaser angle. The engine control system further comprises a second desired air module that selectively determines a desired engine airflow based on the first engine actuator value and the desired torque. The first desired engine air value comprises a desired manifold pressure. The actuator position module determines the desired engine actuator value based on the desired engine airflow and the desired manifold pressure.

In still other features, the desired engine actuator value comprises a desired throttle area. The engine control system further comprises a second actuator determination module that determines a second engine actuator value based on a current engine airflow. The first desired air module determines the first desired engine air value based on the first engine actuator value when in a first mode and based on the second engine actuator value when in a second mode. The engine control system further comprises a mode module that selects the first mode when a change in the desired torque is greater than the predetermined threshold and the desired torque is greater than a second predetermined threshold.

A method of controlling an engine comprises determining a predicted engine airflow based on a desired torque, determining a first engine actuator value based on the predicted engine airflow, selectively determining a first desired engine air value based on the first engine actuator value and the desired torque, and determining a desired engine actuator value based on the first desired engine air value.

In other features, the first engine actuator value comprises a spark advance value. The predicted engine airflow comprises one of predicted air per cylinder (APC) and predicted mass airflow (MAF). The first engine actuator value comprises at least one of a spark advance value, an intake cam phaser angle, an exhaust cam phaser angle, and an air/fuel ratio. The first desired engine air value comprises a desired manifold absolute pressure (MAP). The method further comprises controlling one of a turbocharger and a supercharger based on the desired engine actuator value. The desired engine actuator value comprises a desired boost pressure.

In further features, the first desired engine air value comprises one of desired air per cylinder (APC) and desired mass airflow (MAF). The desired engine actuator value comprises a desired throttle area. The desired engine actuator value comprises a desired cam phaser angle. The method further comprises selectively determining a desired engine airflow based on the first engine actuator value and the desired torque. The first desired engine air value comprises a desired manifold pressure. The desired engine actuator value is based on the desired engine airflow and the desired manifold pressure. The desired engine actuator value comprises a desired throttle area.

In still other features, the method further comprises determining a second engine actuator value based on a current engine airflow. The first desired engine air value is based on the first engine actuator value when in a first mode and based on the second engine actuator value when in a second mode. The method further comprises selecting the first mode when a change in the desired torque is greater than the predetermined threshold and the desired torque is greater than a second predetermined threshold.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
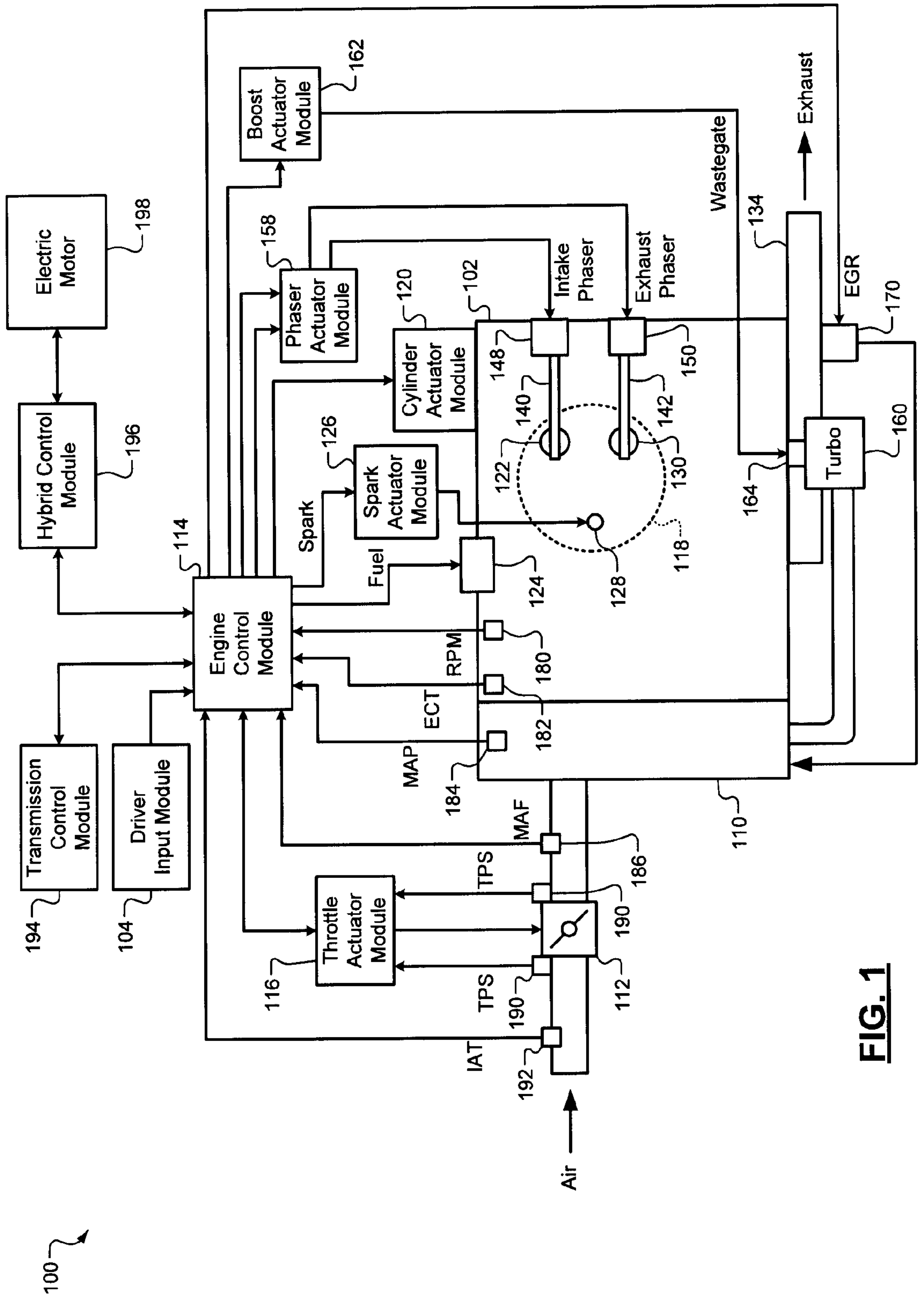
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders to improve fuel economy.

Air from the intake manifold 110 is drawn into the representative cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The air used to produce the compressed air charge may be taken from the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160.

An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce torque during a gear shift. The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the ECM 114, transmission control module 194, and hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position or actuator value.

Similarly, the spark actuator module 126 can be referred to as an actuator, while the corresponding actuator position may be the amount of spark advance. Other actuators may include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

When an engine transitions from producing one torque to producing another torque, many actuator positions will change to produce the new torque most efficiently. For example, spark advance, throttle position, exhaust gas recirculation (EGR) regulation, and cam phaser angles may change. Changing one of these actuator positions often creates engine conditions that would benefit from changes to other actuator positions, which might then result in changes to the original actuators. This feedback results in iteratively updating actuator positions until they are all positioned to produce a desired torque most efficiently.

Large changes in torque often cause significant changes in engine actuators, which cyclically cause significant change in other engine actuators. This is especially true when using a boost device, such as a turbocharger or supercharger. For example, when the engine is commanded to significantly increase a torque output, the engine may request that the turbocharger increase boost.

In various implementations, when boost pressure is increased, detonation, or engine knock, is more likely. Therefore, as the turbocharger approaches this increased boost level, the spark advance may need to be decreased. Once the spark advance is decreased, the desired turbocharger boost may need to be increased to achieve the desired torque.

Figure 2:
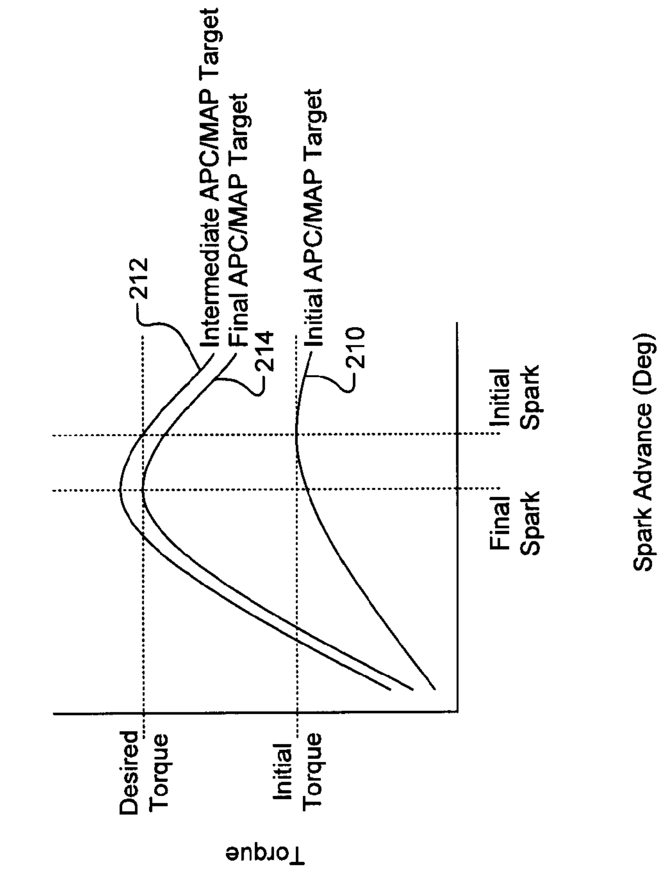
FIG. 2 is a graph that depicts three exemplary torque versus spark advance curves for a normally aspirated engine.
Figure 3:
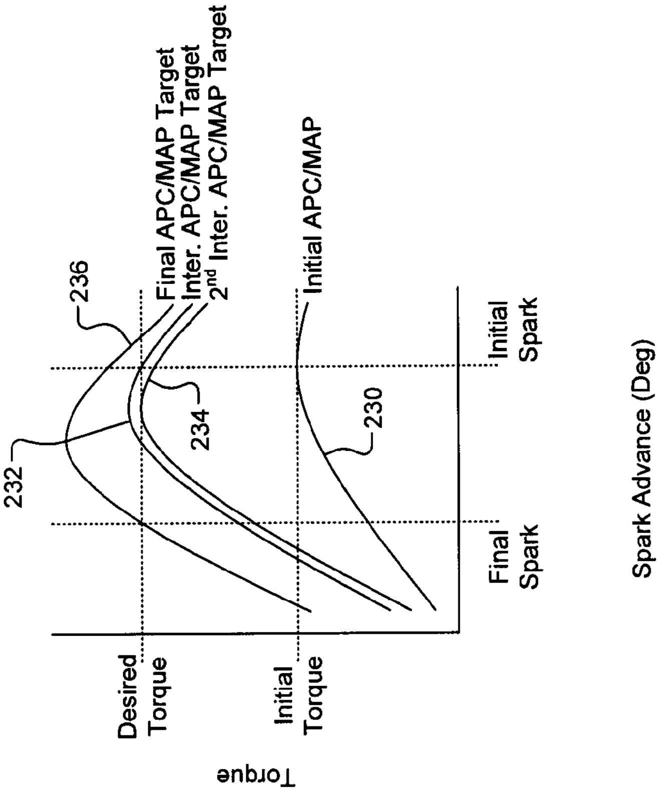
FIG. 3 is a graph that depicts four exemplary curves of torque versus spark advance for a boosted engine according to the principles of the present disclosure.

This circular dependency causes the engine to reach the desired torque more slowly. This problem is exacerbated because of the already slow response of turbocharger boost, commonly referred to as turbo lag. FIGS. 2 and 3 depict exemplary plots of torque curves that illustrate the circular dependency of boost and spark advance.

Figure 4:
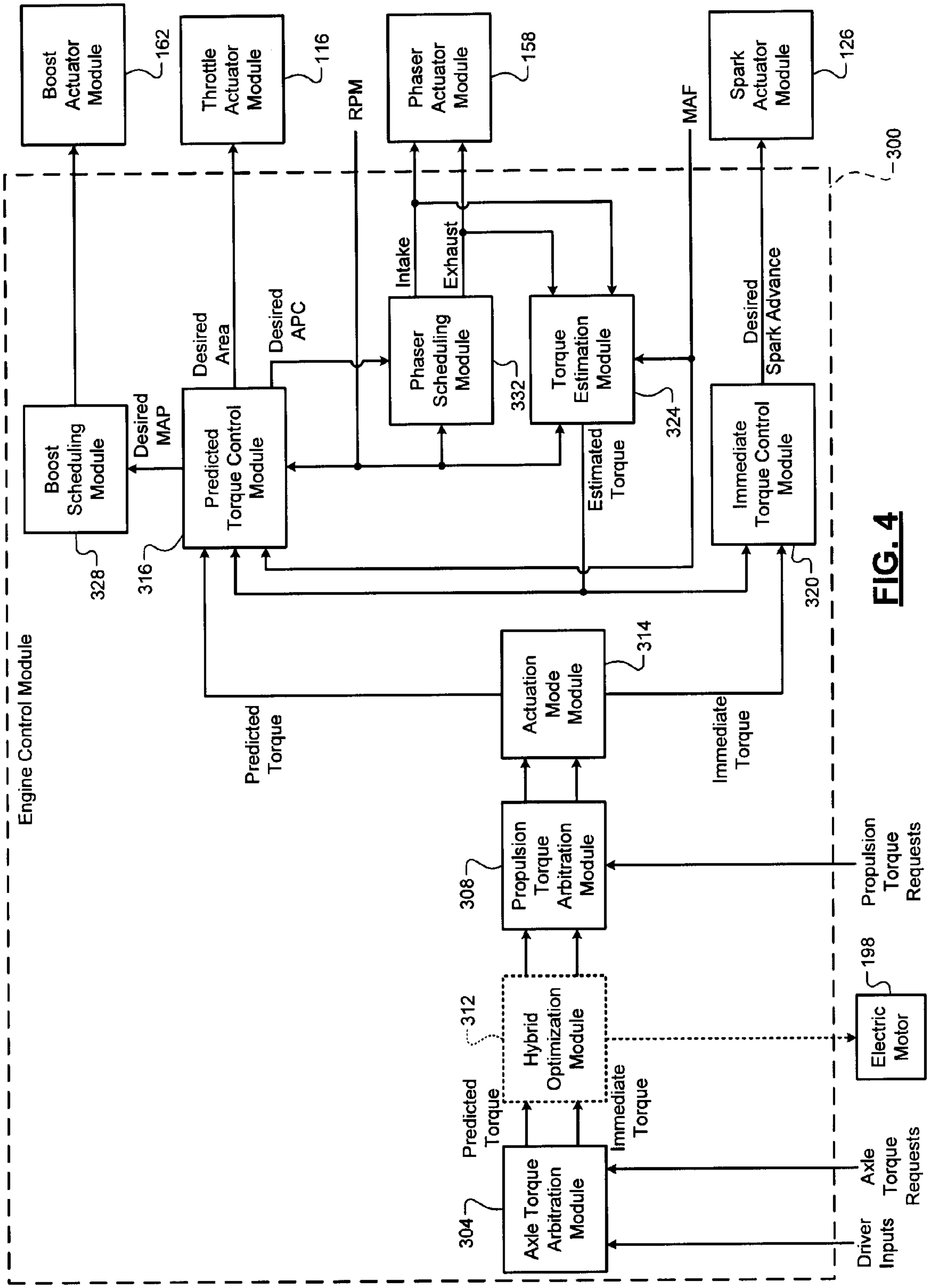
FIG. 4 is a functional block diagram of an exemplary engine control system according to the principles of the present disclosure.
Figure 5:
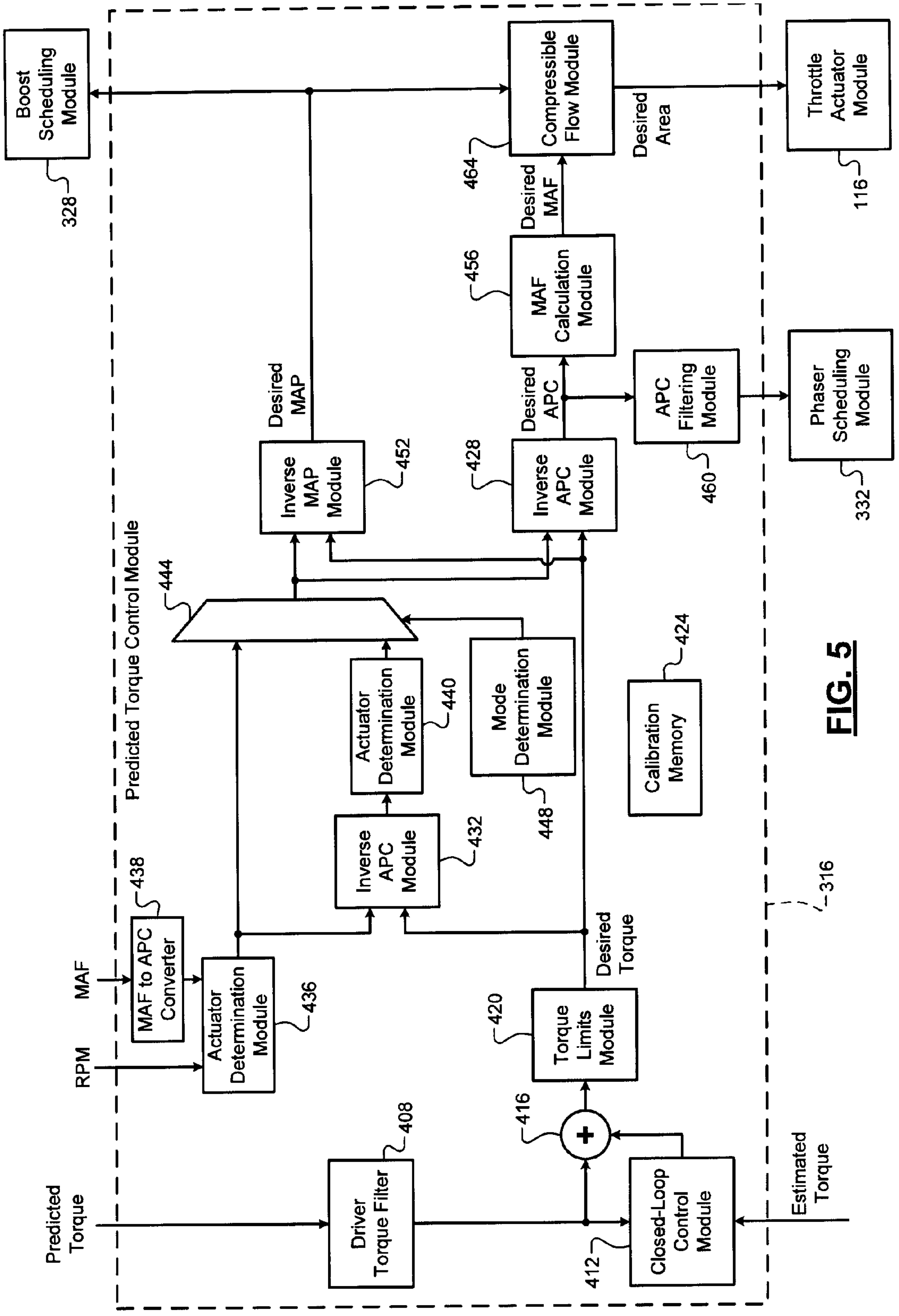
FIG. 5 is a functional block diagram of an exemplary implementation of the predicted torque control module according to the principles of the present disclosure.

FIG. 4 depicts an engine control system capable of accelerating this iterative process. FIG. 5 depicts a predicted torque control module that estimates the airflow that will be present at the new torque level and determines desired actuator positions based on the estimated airflow. The predicted torque control module then determines engine parameters based on the desired actuator positions and the desired torque. For example, the engine parameters may include desired manifold absolute pressure (MAP), desired throttle area, and/or desired air per cylinder (APC).

Figure 6:
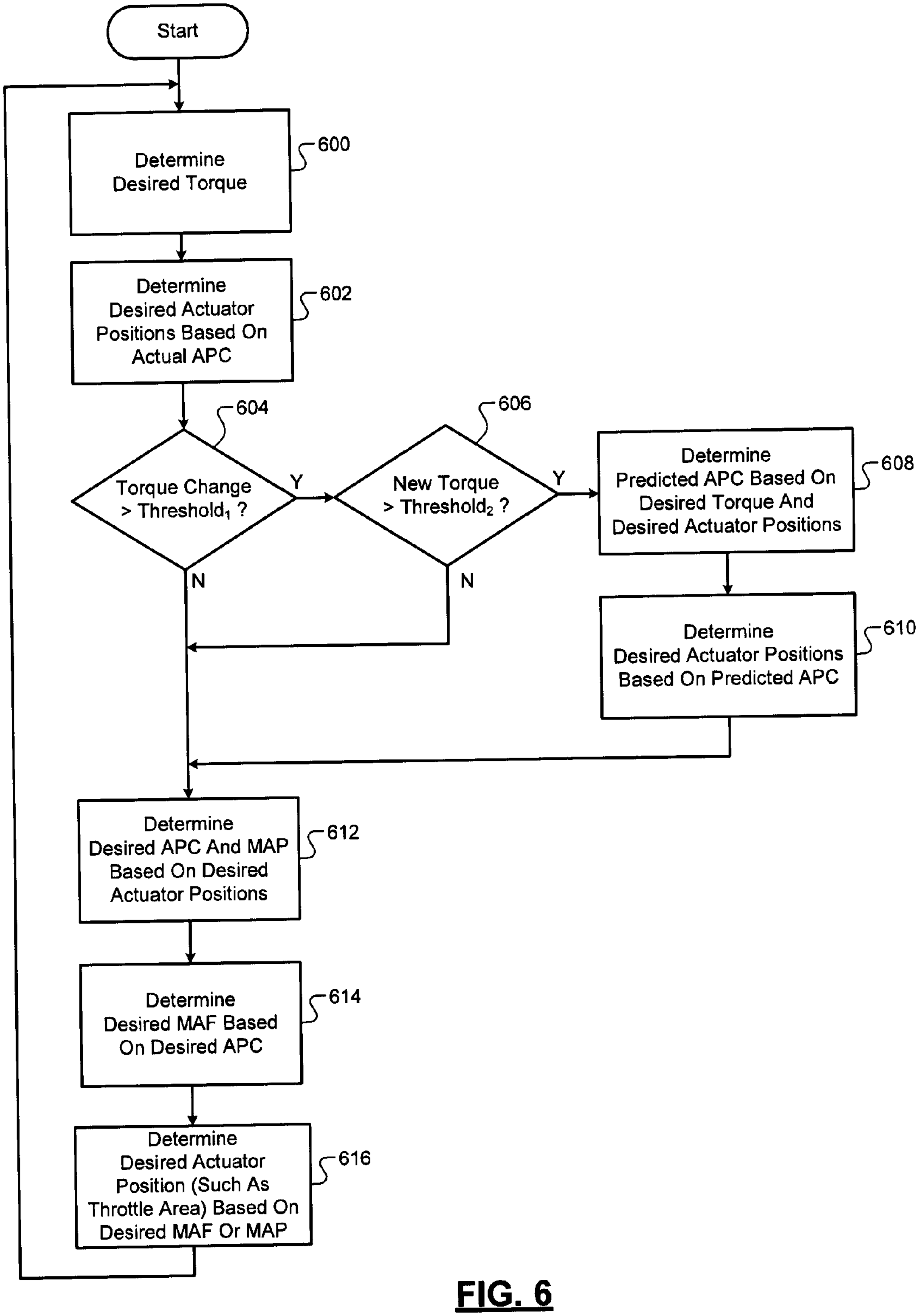
FIG. 6 is a flowchart depicts exemplary steps performed by the predicted torque module according to the principles of the present disclosure.

In other words, the predicted torque control module can model one or more iterations of actuator position updating in software. The actuator positions commanded should then be closer to the final actuator positions. FIG. 6 depicts exemplary steps performed by the engine control system to determine when and how to perform these modeled iterations.

Referring now to FIG. 2, a graph depicts three exemplary torque versus spark advance curves for a normally aspirated engine. The first curve 210 depicts torque versus spark advance for the current air per cylinder (APC) or manifold absolute pressure (MAP). The engine will normally operate at the peak of this curve to achieve the maximum possible torque for a given APC or MAP.

Consequently, for APC/MAP 210, the engine commands the spark advance labeled as initial spark, which generates a torque labeled as initial torque. When the engine is requested to produce a new desired torque, the engine control system determines a required APC or MAP based on current actuator positions, such as spark advance.

The engine control system may determine an APC/MAP 212 that can achieve the desired torque using the current spark advance. The engine control system can then instruct the throttle valve to open to produce the desired APC/MAP 212. As the engine approaches the intermediate APC/MAP 212, the engine control system may determine that the maximum torque at this intermediate APC/MAP 212 is not achieved with the initial spark. Instead, a spark advance labeled as final spark will produce the maximal torque.

The torque achieved with the final spark advance, however, is larger than the desired torque. As the engine approaches the intermediate APC/MAP 212, the engine control system may reduce spark advance to the final spark value and reduce the APC/MAP to the final value 214. This approach may actually achieve the desired torque more quickly by initially targeting a higher APC/MAP (intermediate APC/MAP 212) than was required (final APC/MAP 214). However, FIG. 3 will show how a boosted engine system may experience the opposite effect.

Referring now to FIG. 3, a graph depicts four exemplary curves of torque versus spark advance for a boosted engine. The engine may initially be producing an initial torque using an initial APC/MAP value 230 and an initial spark advance. When the engine is requested to produce a new desired torque, the engine control system may command an APC/MAP value 232. The new APC/MAP value 232 may be achieved by requesting increased boost from a turbocharger.

As the engine approaches the first intermediate APC/MAP value 232, the engine control system recognizes that the maximum torque can be achieved with a reduced spark advance. The smaller spark advance allows a lower APC/MAP value 234 to be used. As the turbocharger boost continues to increase, the engine control system may recognize that the spark advance should be reduced further to prevent detonation.

The most spark advance allowed while still avoiding detonation may be indicated in FIG. 3 by final spark. In order to achieve the desired torque at the final spark advance, a higher APC/MAP value 236 may be commanded. This final APC/MAP value 236 is significantly higher than the intermediate APC/MAP values 232 and 234. The turbocharger now has a new MAP target to meet, which it can only do relatively slowly. Ideally, the turbocharger should have been targeting this higher boost value all along, leading to a faster response. The system according to FIGS. 4-6 will show how to command an APC/MAP close to the final APC/MAP 236 soon after the new desired torque is received.

Referring now to FIG. 4, a functional block diagram of an exemplary engine control system is presented. An engine control module (ECM) 300 includes an axle torque arbitration module 304. The axle torque arbitration module 304 arbitrates between driver inputs from the driver input module 104 and other axle torque requests. For example, driver inputs may include accelerator pedal position. Other axle torque requests may include torque reduction requested during a gear shift by the transmission control module 194, torque reduction requested during wheel slip by a traction control system, and torque requests to control speed from a cruise control system.

The axle torque arbitration module 304 outputs a predicted torque and an immediate torque. The predicted torque is the amount of torque that will be required in the future to meet the driver's torque and/or speed requests. The immediate torque is the torque required at the present moment to meet temporary torque requests, such as torque reductions when shifting gears or when traction control senses wheel slippage.

The immediate torque may be achieved by engine actuators that respond quickly, while slower engine actuators are targeted to achieve the predicted torque. For example, a spark actuator may be able to quickly change spark advance, while cam phaser or throttle actuators may be slower to respond. The axle torque arbitration module 304 outputs the predicted torque and the immediate torque to a propulsion torque arbitration module 308.

In various implementations, the axle torque arbitration module 304 may output the predicted torque and immediate torque to a hybrid optimization module 312. The hybrid optimization module 312 determines how much torque should be produced by the engine and how much torque should be produced by the electric motor 198. The hybrid optimization module 312 then outputs modified predicted and immediate torque values to the propulsion torque arbitration module 308. In various implementations, the hybrid optimization module 312 may be implemented in the hybrid control module 196.

The propulsion torque arbitration module 308 arbitrates between the predicted and immediate torque and propulsion torque requests. Propulsion torque requests may include torque reductions for engine over-speed protection and torque increases for stall prevention.

An actuation mode module 314 receives the predicted torque and the immediate torque from the propulsion torque arbitration module 308. Based upon a mode setting, the actuation mode module 314 determines how the predicted and immediate torques will be achieved. For example, in a first mode of operation, the actuation mode module 314 may output the predicted torque to a predicted torque control module 316. The predicted torque control module 316 converts the predicted torque to desired engine parameters, such as desired manifold absolute pressure (MAP), desired throttle area, and/or desired air per cylinder (APC).

In the first mode of operation, the actuation mode module 314 may instruct an immediate torque control module 320 to set desired engine parameters to achieve the maximum possible torque. The immediate torque control module 320 may control engine parameters that change relatively more quickly than the engine parameters controlled by the predicted torque control module 316. For example, the immediate torque control module 320 may control spark advance, which may reach a commanded value by the time the next cylinder fires. In the first mode of operation, the immediate torque request is ignored by the predicted torque control module 316 and by the immediate torque control module 320.

In a second mode of operation, the actuation mode module 314 may output the predicted torque to the predicted torque control module 316. The actuation mode module 314 may instruct the immediate torque control module 320 to attempt to achieve the immediate torque, such as by retarding the spark.

In a third mode of operation, the actuation mode module 314 may instruct the cylinder actuator module 120 to deactivate cylinders if necessary to achieve the immediate torque request. In this mode of operation, the predicted torque is output to the predicted torque control module 316 and the immediate torque is output to the immediate torque control module 320.

In a fourth mode of operation, the actuation mode module 314 outputs a reduced torque to the predicted torque control module 316. The predicted torque may be reduced only so far as is necessary to allow the immediate torque control module 320 to achieve the immediate torque request using spark retard.

The immediate torque control module 320 receives an estimated torque from a torque estimation module 324. The immediate torque control module 320 may set spark advance using the spark actuator module 126 to achieve the desired immediate torque. The estimated torque may be defined as the amount of torque that could immediately be produced by setting the spark advance to a calibrated value. This value may be calibrated to be the minimum spark advance that achieves the greatest torque for a given RPM and air per cylinder. The immediate torque control module 320 can then select a smaller spark advance that reduces the estimated torque to the immediate torque.

The predicted torque control module 316 also receives the estimated torque and may receive a measured mass air flow (MAF) signal and an engine revolutions per minute (RPM) signal. The predicted torque control module 316 generates a desired manifold absolute pressure (MAP) signal, which is output to a boost scheduling module 328.

The boost scheduling module 328 uses the desired MAP signal to control the boost actuator module 162. The boost actuator module 162 then controls a turbocharger or a supercharger. The predicted torque control module 316 generates a desired area signal, which is output to the throttle actuator module 116. The throttle actuator module 116 then regulates the throttle valve 112 to produce the desired throttle area.

The predicted torque control module 316 generates a desired air per cylinder (APC) signal, which is output to a phaser scheduling module 332. Based on the desired APC signal and the RPM signal, the phaser scheduling module 332 commands the intake and/or exhaust cam phasers 148 and 150 to calibrated values using the phaser actuator module 158.

The torque estimation module 324 may use current intake and exhaust cam phaser angles along with the MAF signal to determine the estimated torque. The current intake and exhaust cam phaser angles may be measured values. Further discussion of torque estimation can be found in commonly assigned U.S. Pat. No. 6,704,638 entitled "Torque Estimator for Engine RPM and Torque Control," the disclosure of which is incorporated herein by reference in its entirety.

Referring now to FIG. 5, a functional block diagram of an exemplary implementation of the predicted torque control module 316 is presented. A driver torque filter 408 receives a torque request from the actuation mode module 314. The driver torque filter 408 may receive signals from the axle torque arbitration module 304 and/or the propulsion torque arbitration module 308 indicating whether the currently commanded torque is a result of driver input. If so, the driver torque filter 408 may filter out high frequency torque changes, such as may be caused by the driver's foot modulating the accelerator pedal while on rough road.

The driver torque filter 408 outputs a desired torque to a closed-loop control module 412 and a summation module 416. The closed-loop control module 412 receives the estimated torque from the torque estimation module 324. The closed-loop control module 412 compares the estimated torque to the desired torque and outputs a correction factor to the summation module 416. The summation module 416 adds the desired torque from the driver torque filter 408 with the correction factor from the closed-loop control module 412.

In various implementations, the closed-loop control module 412 may simply output a correction factor equal to the difference between the desired torque and the estimated torque. Alternatively, the closed-loop control module 412 may use a proportional-integral (PI) control scheme to meet the desired torque from the driver torque filter 408. The torque correction factor may include a proportional offset based on the difference between the desired torque and the estimated torque. The torque correction factor may also include an offset based on an integral of the difference between the desired torque and the estimated torque. The torque correction factor $T_{pi}$, which is output to the summation module 416, may be determined by the following equation:

$$T_{pi}=K_p*(T_{des}-T_{est})+K_i*\int(T_{des}-T_{est})\partial t, \quad (1)$$

where $K_p$ is a pre-determined proportional constant and $K_i$ is a pre-determined integral constant.

Further discussion of PI control can be found in commonly assigned patent application Ser. No. 11/656,929, filed Jan. 23, 2007, and entitled "Engine Torque Control at High Pressure Ratio," the disclosure of which is incorporated herein by reference in its entirety. Additional discussion regarding PI control of engine speed can be found in commonly assigned patent application Ser. No. 11/685,735, filed Mar. 13, 2007, and entitled "Torque Based Engine Speed Control," the disclosure of which is incorporated herein by reference in its entirety.

An output of the summation module 416 is received by a torque limits module 420. The torque limits module 420 may apply limits to the desired torque. For example, an upper limit may be applied that protects against invalid torque requests or torque requests that would damage the engine. The torque limits module 420 may also apply a lower limit to prevent stalling the engine.

The lower and upper limits may be determined from calibration memory 424, and may be based on RPM. The torque limits module 420 outputs the desired torque, as limited, to first and second inverse APC modules 428 and 432. A first actuator determination module 436 receives an RPM signal and a measured APC signal. The APC signal may be received from a MAF to APC converter 438 that converts a measured MAF into an APC.

The first actuator determination module 436 determines desired actuator positions, such as intake and exhaust cam phaser angles, spark advance, and air/fuel ratio. The intake and exhaust cam phaser angles and spark advance may be functions of RPM and APC, while the air/fuel ratio may be a function of APC.

These functions may be implemented in the calibration memory 424. The APC value may be filtered before being used to determine one or more of the actuator positions. For example, the air/fuel ratio may be determined based upon a filtered APC. The first actuator determination module 436 outputs the actuator positions to the second inverse APC module 432 and to a multiplexer 444.

The actuator positions output by the first actuator determination module 436 are based on current APC. However, to achieve a new desired torque, the APC may need to change significantly. The second inverse APC module 432 can determine a predicted APC that will achieve the desired torque. A second actuator determination module 440 then determines actuator positions based on the predicted APC instead of the current APC.

While this approach, as depicted in FIG. 5, simulates a single iteration of actuator updating, multiple iterations may be simulated. For example, additional inverse APC modules and actuator determination modules may be inserted between the second actuator determination module 440 and the multiplexer 444. In various implementations, the actuator determination modules, including the first and second actuator determination modules 436 and 440, may be implemented using a common software module. In various implementations, the inverse APC modules, including the first and second inverse APC modules 428 and 432, may be implemented using a common software module.

A mode determination module 448 controls the multiplexer 444 to choose whether the predicted APC or the current APC should be used to determine actuator positions. The mode determination module 448 therefore instructs the multiplexer 444 to output actuator positions from either the first or second actuator determination modules 436 and 440. The multiplexer 444 outputs the selected actuator positions to the first inverse APC module 428 and an inverse MAP module 452. The mode determination module 448 may select the actuator positions based upon the predicted APC when a large torque change has been requested and when the new torque is above a threshold.

The first and second inverse APC modules 428 and 432 may use similar calculations to determine APC based upon the desired torque and the received actuator positions. The inverse APC modules 428 and 432 may implement a torque model that estimates torque based on actuator positions such as APC, spark advance (S), intake (I) and exhaust (E) cam phaser angles, air/fuel ratio (AF), oil temperature (OT), and number of cylinders currently being fueled (#). If the desired torque $T_{des}$ is assumed to be the torque model output, and the received actuator positions are substituted, the inverse APC modules 428 and 432 can solve the torque model for the only unknown, APC. This inverse use of the torque model may be represented as follows:

$$APC_{des}=T_{apc}^{-1}(T_{des},RPM,S,I,E,AF,OT,\#). \quad (2)$$

The first inverse APC module 428 outputs the calculated APC to a MAF calculation module 456 and an APC filtering module 460. As stated above, the second inverse APC module 432 outputs a calculated desired APC to the second actuator determination module 440. The APC filtering module 460 may apply a low-pass filter, such as a first order lag filter, to the desired APC signal. The APC filtering module 460 outputs the filtered APC to the phaser scheduling module 332, which can control the intake and exhaust cam phasers 148 and 150 based on the filtered APC.

The inverse MAP module 452 determines a desired MAP based on the desired torque from the torque limits module 420 and the selected actuator positions from the multiplexer 444. The desired MAP may be determined by the following equation:

$$MAP_{des}=T_{map}^{-1}((T_{des}+f(\text{delta\_}T)),RPM,S,I,E,AF,OT,\#), \qquad (3)$$

where f(delta_T) is a filtered difference between MAP-based and APC-based torque estimators. The inverse MAP module 452 outputs the desired MAP to the boost scheduling module 328 and a compressible flow module 464.

The MAF calculation module 456 determines a desired MAF based on the desired APC. The desired MAF may be calculated using the following equation:

$$MAF_{des}=\frac{APC_{des}\cdot \text{RPM}\cdot \#}{60\,\frac{\text{s}}{\text{min}}\cdot 2\,\frac{\text{rev}}{\text{firing}}}, \qquad (4)$$

where # is the number of cylinders currently being fueled. The desired MAF is output to a compressible flow module 464.

The compressible flow module 464 determines a desired throttle area based on the desired MAP and the desired MAF. The desired area may be calculated using the following equation:

$$Area_{des}=\frac{MAF_{des}\cdot\sqrt{R_{gas}\cdot T}}{P_{boro}\cdot\Phi(P_r)},\ \text{where } P_r=\frac{MAP_{des}}{P_{baro}}, \qquad (5)$$

and where $R_{gas}$ is the ideal gas constant, T is intake air temperature, and $P_{baro}$ is barometric pressure. $P_{baro}$ may be directly measured using a sensor, such as the IAT sensor 192, or may be calculated using other measured or estimated parameters.

The Φ function may account for changes in airflow due to pressure differences on either side of the throttle valve 112. The Φ function may be specified as follows:

$$\Phi(P_r)=\begin{cases}\sqrt{\frac{2\gamma}{\gamma-1}\left(1-P_r^{\frac{\gamma-1}{\gamma}}\right)} & \text{if } P_r>P_{critical}\\ \sqrt{\gamma\left(\frac{2}{\gamma+1}\right)^{\frac{\gamma+1}{\gamma-1}}} & \text{if } P_r\le P_{critical}\end{cases},\ \text{where} \qquad (6)$$

$$P_{critical}=\left(\frac{2}{\gamma+1}\right)^{\frac{\gamma}{\gamma-1}}=0.528\text{ for air}, \qquad (7)$$

and where γ is a specific heat constant that is between approximately 1.3 and 1.4 for air. $P_{critical}$ is defined as the pressure ratio at which the velocity of the air flowing past the throttle valve 112 equals the velocity of sound, which is referred to as choked or critical flow. The compressible flow module 464 outputs the desired area to the throttle actuator module 116, which controls the throttle valve 112 to provide the desired opening area.

Referring now to FIG. 6, a flowchart depicts exemplary steps performed by the predicted torque control module 316. Control begins in step 600, where the desired engine torque is determined. Control continues in step 602, where control determines desired actuator positions based on the current APC. Control continues in step 604, where control determines whether a change in desired torque is greater than a first threshold.

Control may also determine whether the desired torque is greater than a second threshold in step 606. If both conditions are true, control transfers in step 608; otherwise, control transfers in step 612. In step 608, a predicted APC is determined based on the desired torque and the desired actuator positions. Control continues in step 610, where desired actuator positions are determined based on the predicted APC. These are a replacement for the previous desired actuator positions from step 602. Control then continues in step 612.

In step 612, control determines a desired APC and a desired MAP based on the desired actuator positions. Control continues in step 614, where control determines a desired MAF based on the desired APC. Control continues in step 616, where control determines a desired actuator position based on the desired MAF/APC or desired MAP. In various implementations, the desired actuator position determined in step 616 may not be included as one of the desired actuator positions determined in steps 602 or 610.

For example, control may determine a desired throttle area based on the desired MAF and the desired MAP. Control may also determine desired boost pressure based on desired MAP. Control may also determine desired phaser angle based on desired APC. Control then returns to step 600.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An engine control system comprising:

a predicted airflow module that determines a predicted engine airflow based on a desired torque;

a first actuator determination module that determines a first engine actuator value based on said predicted engine airflow;

a first desired air module that selectively determines a first desired engine air value based on said first engine actuator value and said desired torque; and an actuator position module that determines a desired engine actuator value based on said first desired engine air value.

2. The engine control system of claim 1 wherein said first engine actuator value comprises a spark advance value.

3. The engine control system of claim 1 wherein said predicted engine airflow comprises one of predicted air per cylinder (APC) and predicted mass airflow (MAF).

4. The engine control system of claim 1 wherein said first engine actuator value comprises at least one of a spark advance value, an intake cam phaser angle, an exhaust cam phaser angle, and an air/fuel ratio.

5. The engine control system of claim 1 wherein said first desired engine air value comprises a desired manifold absolute pressure (MAP).

6. The engine control system of claim 5 further comprising a boost control module that controls one of a turbocharger and a supercharger based on said desired engine actuator value, wherein said desired engine actuator value comprises a desired boost pressure.

7. The engine control system of claim 1 wherein said first desired engine air value comprises one of desired air per cylinder (APC) and desired mass airflow (MAF).

8. The engine control system of claim 7 wherein said desired engine actuator value comprises a desired throttle area.

9. The engine control system of claim 7 wherein said desired engine actuator value comprises a desired cam phaser angle.

10. The engine control system of claim 1 further comprising a second desired air module that selectively determines a desired engine airflow based on said first engine actuator value and said desired torque, wherein said first desired engine air value comprises a desired manifold pressure, and wherein said actuator position module determines said desired engine actuator value based on said desired engine airflow and said desired manifold pressure.

11. The engine control system of claim 10 wherein said desired engine actuator value comprises a desired throttle area.

12. The engine control system of claim 1 further comprising a second actuator determination module that determines a second engine actuator value based on a current engine airflow, wherein said first desired air module determines said first desired engine air value based on said first engine actuator value when in a first mode and based on said second engine actuator value when in a second mode.

13. The engine control system of claim 12 further comprising a mode module that selects said first mode when a change in said desired torque is greater than said predetermined threshold and said desired torque is greater than a second predetermined threshold.

14. A method of controlling an engine, comprising:

determining a predicted engine airflow based on a desired torque;

determining a first engine actuator value based on said predicted engine airflow;

selectively determining a first desired engine air value based on said first engine actuator value and said desired torque; and determining a desired engine actuator value based on said first desired engine air value.

15. The method of claim 14 wherein said first engine actuator value comprises a spark advance value.

16. The method of claim 14 wherein said predicted engine airflow comprises one of predicted air per cylinder (APC) and predicted mass airflow (MAF).

17. The method of claim 14 wherein said first engine actuator value comprises at least one of a spark advance value, an intake cam phaser angle, an exhaust cam phaser angle, and an air/fuel ratio.

18. The method of claim 14 wherein said first desired engine air value comprises a desired manifold absolute pressure (MAP).

19. The method of claim 18 further comprising controlling one of a turbocharger and a supercharger based on said desired engine actuator value, wherein said desired engine actuator value comprises a desired boost pressure.

20. The method of claim 14 wherein said first desired engine air value comprises one of desired air per cylinder (APC) and desired mass airflow (MAF).

21. The method of claim 20 wherein said desired engine actuator value comprises a desired throttle area.

22. The method of claim 20 wherein said desired engine actuator value comprises a desired cam phaser angle.

23. The method of claim 14 further comprising selectively determining a desired engine airflow based on said first engine actuator value and said desired torque, wherein said first desired engine air value comprises a desired manifold pressure, wherein said desired engine actuator value is based on said desired engine airflow and said desired manifold pressure, and wherein said desired engine actuator value comprises a desired throttle area.

24. The method of claim 14 further comprising determining a second engine actuator value based on a current engine airflow, wherein said first desired engine air value is based on said first engine actuator value when in a first mode and based on said second engine actuator value when in a second mode.

25. The method of claim 24 further comprising selecting said first mode when a change in said desired torque is greater than said predetermined threshold and said desired torque is greater than a second predetermined threshold.

* * * * *